(12) United States Patent
Wang et al.

(10) Patent No.: US 8,734,740 B1
(45) Date of Patent: May 27, 2014

(54) PROCESS AND COMPOSITION FOR REMOVAL OF ARSENIC AND OTHER CONTAMINANTS FROM SYNTHETIC GAS

(71) Applicant: Clariant Corporation, Louisville, KY (US)

(72) Inventors: Justin X. Wang, Louisville, KY (US); Yeping Cai, Louisville, KY (US); William M. Faris, Louisville, KY (US)

(73) Assignee: Clariant Corporation, Louisville, KS (US)

( * ) Notice: Subject to any disclaimer, the term of this patent is extended or adjusted under 35 U.S.C. 154(b) by 0 days.

(21) Appl. No.: 13/832,094

(22) Filed: Mar. 15, 2013

(51) Int. Cl.
*B01J 20/00* (2006.01)
*C01B 3/56* (2006.01)
*C10K 1/20* (2006.01)

(52) U.S. Cl.
USPC ......... 423/210; 423/561.1; 252/184; 502/400

(58) Field of Classification Search
USPC ................. 423/210, 561.1; 252/184; 502/400
See application file for complete search history.

(56) References Cited

U.S. PATENT DOCUMENTS

| | | | |
|---|---|---|---|
| 3,782,076 A | 1/1974 | Carr et al. | |
| 3,812,653 A | 5/1974 | Massoth et al. | |
| 4,069,140 A | 1/1978 | Wunderlich | |
| 4,094,777 A * | 6/1978 | Sugier et al. | 210/670 |
| 4,439,313 A | 3/1984 | Schindler et al. | |
| 4,462,896 A | 7/1984 | Kitagawa et al. | |
| 4,869,735 A | 9/1989 | Miyazawa et al. | |
| 4,911,825 A | 3/1990 | Roussel et al. | |
| 5,330,560 A | 7/1994 | Chao et al. | |
| 5,401,392 A | 3/1995 | Courty et al. | |
| 7,998,898 B2 * | 8/2011 | Gadkarec et al. | 502/417 |
| 8,241,491 B1 | 8/2012 | Zaid et al. | |
| 2007/0080099 A1 | 4/2007 | Reid et al. | |
| 2012/0103912 A1 * | 5/2012 | Hetherington et al. | 210/688 |
| 2012/0135214 A1 * | 5/2012 | Dawes et al. | 428/219 |
| 2013/0116345 A1 * | 5/2013 | Pansare et al. | 518/702 |

* cited by examiner

*Primary Examiner* — Timothy Vanoy
(74) *Attorney, Agent, or Firm* — RatnerPrestia

(57) ABSTRACT

A process for removing one or more of arsenic and other contaminants from a synthetic gas feedstock comprising a sulfur compound. The synthetic gas feedstock is contacted with a composition having an active material. The active material includes one or more elements having an electronegativity from 1.6 to 2.0 on the Pauling scale. At least a portion of the active material is a sulfide phase.

25 Claims, No Drawings

PROCESS AND COMPOSITION FOR REMOVAL OF ARSENIC AND OTHER CONTAMINANTS FROM SYNTHETIC GAS

FIELD OF THE INVENTION

The present invention relates to a process and a composition for removing arsenic and/or one or more other contaminants from a synthetic gas feedstock stock.

BACKGROUND OF THE INVENTION

Production of synthetic gas ("syngas") from a carbon-containing feedstock using gasification and other processes is known. During gasification, the carbon-containing feedstock, which can be natural gas, coal, biomass, organic waste, crude oil, oil residues and/or the like, is fed to a gasifier. In the gasifier, the carbon-containing feedstock undergoes a set of chemical reactions at high temperatures in the presence of controlled amounts of oxygen and/or steam. Syngas, a gas mixture, results from this process.

The main components of syngas can include varying ratios of hydrogen, carbon monoxide, and carbon dioxide. Other constituents of syngas can include methane, carbon dioxide, water vapor, sulfur compounds, ammonia, nitrogen, hydrogen cyanide and the like.

Syngas is often further processed and purified in one or more downstream processes to produce a usable syngas product. Conventional processing and purification of a syngas feedstock can include the production of synthetic natural gas ("SNG"), conversion of carbon monoxide to hydrogen gas, removing carbon dioxide and/or sulfur, production of methanol, and/or purifying to remove other undesirable components. Purifying can result in a waste gas, which can include valuable hydrocarbons (including olefins and liquid hydrocarbons) which, in turn, may fuel the gasification process.

Syngas also includes arsenic, selenium, and other trace contaminants. Some of these trace contaminants, including arsenic and selenium, are particularly deleterious and can poison the catalysts in downstream processes, resulting in deactivation of the catalyst. For example, both arsenic and selenium may poison the catalysts used in the downstream water-gas shift reaction which adjusts the hydrogen-to-carbon monoxide ($H_2$/CO) ratio.

Accordingly, there is a need to remove certain trace contaminants, including arsenic and selenium, from the syngas feedstock to avoid deactivation of catalysts used in downstream processes.

SUMMARY OF THE INVENTION

Aspects of the present invention relate to compositions for removing arsenic and/or one or more other contaminants from a syngas feedstock, and processes employing the use of the above compositions to remove arsenic and/or one or more other contaminants from a syngas feedstock.

In accordance with one aspect of the present invention, a process for removing to one or more of arsenic and other metalloid or metallic compounds from a syngas feedstock is provided. The syngas feedstock includes a sulfur compound. The syngas feedstock is contacted with a composition. The composition includes an active material. The active material includes one or more elements having an electronegativity from 1.6 to 2.0 on the Pauling scale. At least a portion of the active material is present as a sulfide phase.

In another embodiment, a process for removing one or more of arsenic and other metalloid or metallic compounds from a syngas feedstock is disclosed. The syngas feedstock includes a sulfur compound. Sulfur is present in the sulfur compound in an amount that ranges from 50 ppm to 3 vol. % based on the overall volume of the syngas feedstock. The syngas feedstock is contacted with a composition comprising an active material. The active material includes one or more elements having an electronegativity from 1.6 to 2.0 on the Pauling scale. At least a portion of the active material is present as a sulfide phase.

In accordance with another aspect of the present invention, a composition for removing one or more of arsenic and other metalloid or metallic compounds from a syngas feedstock is disclosed. The syngas feedstock includes a sulfur compound. The composition includes an active material. The active material includes one or more elements having an electronegativity from 1.6 to 2.0 on the Pauling scale. At least a portion of the active material is present as a sulfide phase.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The present invention is directed to compositions and processes employing these compositions to scavenge arsenic and other contaminants from a syngas feedstock. Compositions according to the present invention comprise an active material comprised of one or more elements having an electronegativity from 1.6 to 2.0 on the Pauling scale. Elements falling to within this preferred range include, without limitation: Al, Si, V, Cr, Fe, Co, Ni, Cu, Zn, Ga, Nb, Tc, Ag, Cd, in, Sn, Re, Ti, and Po.

The active material preferably includes a sulfide phase. In some embodiments, at least a portion of the active material is converted to a sulfide phase. The metallic phase of the active material is less favored due to the by-products generated, which include, e.g., methane and is methanol. Thus, most preferably, all or most of the active material is converted to a sulfide phase.

It has been discovered that the above described compositions, under specified reaction conditions and in the presence of a syngas feedstock which includes one or more sulfur species, can eliminate or reduce trace contaminants in the syngas feedstock such as arsenic and selenium. The inventive processes and compositions are not, however, limited to the removal of arsenic and selenium. Indeed, the inventive processes and compositions permit the removal of other contaminants, including, e.g., Si, K, Ca, V, Fe, and Ni.

As used herein, the term "syngas feedstock" refers to any syngas feedstock which contains mainly carbon monoxide, carbon dioxide, and hydrogen. The syngas feedstock refined in the disclosed processes and with the disclosed compositions preferably includes a sulfur species, such as $H_2S$ or COS. The sulfur species may be present originally in the syngas feedstock, or added to the syngas feedstock prior to or during the disclosed process.

As used herein, the term "active material" refers a material comprised or one or more elements having an electronegativity on the Pauling scale ranging from 1.6 to 2.0, more preferably from 1.8 to 1.95, and most preferably from 1.85 to 1.91.

As used herein, the term "sulfide phase" refers to the portion of the active material which has been sulfided (i.e., reacted with one or more sulfur compounds to form a metal sulfide).

While not intending to limited the present invention to a specific theory, it is believed that, under equilibrium conditions, arsenic and selenium (respectively having electronegativities of 2.18 and 2.55 and ionic radii of 1.15 Å and 1.15 Å) generally will not replace oxygen (having an electronegativity of 3.44 and an ionic radius of 0.6 Å) in a metal oxide (M-O) to form a metal arsenide (M-As) or metal selenide (M-Se) compound at high temperatures and in the presence of oxidative agents such as $H_2O$ or $CO_2$. Specifically, the equilibrium equation flavors maintaining the M-0 compound since this bond is much stronger than the bond present in either the M-As or M-Se compounds.

Arsenic and selenium will, however, replace sulfur (having an electronegativity of 2.58 and an ionic radius of 1.0 Å) in a metal sulfide (M-S) to form M-As or M-Se compounds at high temperatures and in the presence of oxidative agents such as $H_2O$ or $CO_2$. Because oxidative agents (such as $H_2O$ or $CO_2$, both of which may be present in the syngas feedstock) gradually replace MS with M-O, more than 50 ppm sulfur is preferably present in the syngas feedstock. Too much sulfur in the syngas feedstock, however, suppresses the formation of metal arsenide or metal selenide. Accordingly, a sulfur species is preferably present in the syngas feedstock in a range of about 50 ppm to about 3% (based on the total volume of the syngas feedstock), more preferably 100 ppm to about 1%, and most preferably 200 ppm to about 6000 ppm.

Elements outside of the disclosed electronegativity range of 1.6 to 2.0 may alter the above described equilibrium. For example, elements having an electronegativity less than 1.6 may react too strongly with oxygen, inhibiting the formation of M-S. And while M-S may still be formed under such conditions, it can be easily replaced by M-O in the presence of the oxidative agents contained in the syngas feedstock. Further, the strength of the MS bond will inhibit the formation of M-As or M-Se. Conversely, elements having an electronegativity greater than 2.0 weakly react with arsenide or selenium. Additionally, under these conditions cause instability of the M-As or M-Se in the presence of the oxidative agents and sulfur compounds contained in the syngas feedstock.

As described above, the active material preferably exists, at least in part, in a sulfide phase (i.e., MS) during the contaminant reducing process. In one embodiment, the active material is produced as a sulfide material. The active material can also be made by sulfiding oxides to sulfides prior to contacting the syngas feedstock (i.e., outside of the reactor) or in situ in the reactor.

In an exemplary embodiment, the active material is manufactured by the precipitation of water soluble salts such as nitrates, sulfates, halides, or organic salts. Calcination then converts the active material to an oxide, which may then be sulfided to form the sulfide phase.

In another exemplary embodiment, the active material is dispersed onto a carrier material through impregnation with water soluble salts of the active material. Following impregnation, calcination converts the active material to an oxide, which may then be sulfided to form the sulfide phase.

In yet another embodiment, the water soluble salts of the active material and the carrier material are co-precipitated. Calcination then provides a mixture of active material and carrier material. Finally, the active material may then be suifided to form the sulfide phase. Alternatively, the sulfided active material may first be formed (through, e.g., precipitation). The sulfided active material may then be formed or mixed with the carrier following the formation.

Other manners of manufacturing and forming the active material, at least a portion of which is a sulfide phase, will become apparent to a person having ordinary skill in the art.

The carrier material may be selected from any, or a combination, of aluminum oxide, silicon oxide, aluminum-silicon oxide, magnesium oxide, manganese oxide, zirconium oxide, titanium oxide, clay, zeolite, active carbon, cement or other known suitable materials.

Where the active material is combined with a carrier material, the content of the active material preferably has a weight percentage (calculated as an oxide) in the range of 5% to 100%, more preferably in the range of 10% to 70%, and most preferably in the range of 20% to 50%. The remaining balance is carrier material.

The active material, whether or not combined with a carrier material, may be formed as an extrusion, sphere, pellet, cylinder (hollow or otherwise), symmetrical and asymmetrical tri-quadrulobes, or other suitable shape/medium known to those of ordinary skill in the art.

Removal of arsenic and the other contaminants occurs by passing the syngas feedstock through a bed comprised of an effective amount of the inventive composition. The bed may be positioned at the top of the water-gas shift reactor. Alternatively, in another embodiment, the bed may be contained in a separate reactor upstream from the water-gas shift reactor.

Suitable reaction temperatures for contacting the syngas feedstock with the bed include preferably a temperature range from about 150° C. to about 600° C., more preferably from about 180° C. to about 400° C., and most preferably from about 200° C. to about 320° C. Suitable reaction pressures include preferably a pressure range from about 0 MPa to about 20 MPa, more preferably from about 1 MPa to about 12 MPa, and most preferably from about 2 MPa to about 10 MPa.

Formation of the Active Material

Example 1

355 g ammonium molybdate and 408 g cobalt nitrate were dissolved in a 1400 cc solution of $NH_4OH$. A 1500 cc $Al_2O_3$/MgO extrusion was soaked in the solution for 30 minutes. The extrusion was then dried and calcined at 400° C. for 4 hours. A sample (S-1) with 4.1% CoO and 10.2% $MoO_3$ on an $Al_2O_3$/MgO carrier was obtained.

Example 2

730 g ferrous sulfate was dissolved in 1100 cc $H_2O$. 1500 cc $Al_2O_3$ extrusion was soaked in the solution for 30 minutes. The extrusion was then dried and calcined at 400° C. for 4 hours. A sample (S-2) with 163% $Fe_2O_3$ on an $Al_2O_3$ carrier was obtained.

Example 3

1000 g cobalt nitrate was dissolved in 1100 cc $H_2O$. 1500 cc $Al_2O_3$ extrusion was soaked in this solution for 30 minutes. The extrusion was then dried and calcined at 400° C. for 4 hours. A sample (S-3) with 13.2% $Co_3O_4$ on an $Al_2O_3$ carrier was obtained.

Example 4

1700 g cobalt nitrate was dissolved in 500 cc $H_2O$, 1500 cc $Al_2O_3$ extrusion was soaked in this solution for 30 minutes. The extrusion was then dried and calcined at 400° C. for 4 hours. A sample (5-4) with 23.2% $Co_3O_4$ on an $Al_2O_3$ carrier was obtained.

Example 5

1700 g cobalt nitrate was dissolved in 500 cc $H_2O$. 1500 cc $Al_2O_3$ extrusion was soaked in this solution for 30 minutes.

The extrusion was then dried and calcined at 400° C. for 4 hours. The calcined extrusion was then soaked for 30 minutes in a second solution in which 500 g cobalt nitrate was dissolved in 1000 cc $H_2O$. Calcination at 400° C. for an additional 4 hours followed. A sample (S-5) with 35.8% $Co_3O_4$ on an $Al_2O_3$ carrier was obtained.

Sulfidation of the Active Material and Removal of Contaminants from a Syngas Feedstock Example 6

Samples S-1 through S-5 were sulfided with 2% $H_2S$ under reducing conditions in the presence of hydrogen gas) to provide the sulfide phase. Contaminant removal tests were then performed at the reaction conditions of 260° C. and 6 MPa. The syngas feedstock had a dry gas composition of $CO:CO_2$: $H_2:N_2$=50:12:37:1, a steam gas ratio of 2.0, 1400 ppm of sulfur (present in the term of $H_2S$ and COS), 0.7 ppm As and 0.01 ppm Se. After processing a syngas feedstock having a volume of $6\times10^4$ $m^3$, the samples were unloaded and analyzed for As and Sc content. The results are summarized below in table 1.

| Sample | As, g/kg-sample | Se, g/kg-sample |
|---|---|---|
| S-1 | 27.5 | 0.4 |
| S-2 | 65 | 1.0 |
| S-4 | 129 | 1.9 |

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A process for removing contaminants comprising one or more of arsenic and selenium from a synthetic gas feedstock comprising a sulfur compound wherein the synthetic gas feedstock comprises sulfur in an amount that ranges from 50 ppm to 3 vol. % based on the overall volume of the synthetic gas feed, in which the synthetic gas feedstock is contacted with a composition comprising an active material comprising one or more elements having an electronegativity from 1.6 to 2.0 on the Pauling scale, wherein at least a portion of the active material is a sulfide phase, and wherein arsenic and/or selenium at least partly replaces the sulfur of the sulfide phase.

2. The process of claim 1 wherein the synthetic gas feedstock is contacted with the composition at a temperature range from about 150° C. to about 600° C.

3. The process of claim 1 wherein the synthetic gas feedstock is contacted with the composition at a temperature range from about 180° C. to about 400° C.

4. The process of claim 1 wherein the synthetic gas feedstock is contacted with the composition at a temperature range from about 200° C. to about 320° C.

5. The process of claim 1 wherein the synthetic gas feedstock is contacted with the composition at a pressure range from about 0 MPa to about 20 MPa.

6. The process of claim 1 wherein the synthetic gas feedstock is contacted with the composition at a pressure range from about 1 MPa to about 12 MPa.

7. The process of claim 1 wherein the synthetic gas feedstock is contacted with the composition at a pressure range from about 2 MPa to about 10 MPa.

8. The process of claim 1 wherein the synthetic gas feedstock comprises a sulfur compound comprising sulfur in an amount that ranges from 100 ppm to 1 vol. % based on the overall volume of the synthetic gas feed.

9. The process of claim 1 wherein the synthetic gas feedstock comprises a sulfur compound comprising sulfur in an amount that ranges from 200 ppm to 6000 ppm based on the overall volume of the synthetic gas feed.

10. The process of claim 1 wherein the active material comprises one or more elements having an electronegativity from 1.8 to 1.95 on the Pauling scale.

11. The process of claim 1 wherein the active material comprises one or more elements having an electronegativity from 1.85 to 1.91 on the Pauling scale.

12. The process of claim 1 wherein the active material is dispersed on a carrier material selected from the group consisting of aluminum oxide, silicon oxide, aluminum-silicon oxide, magnesium oxide, manganese oxide, zirconium oxide, titanium oxide, clay, zeolite, activated carbon, and cement.

13. The process of claim 1 wherein the active material is present in an amount that ranges from about 5 wt. % to about 100 wt. %, calculated as an oxide, and wherein the carrier material comprises the remaining wt. %.

14. A process for removing contaminants comprising one or more of arsenic and selenium from a synthetic gas feedstock comprising a sulfur in an amount that ranges from 50 ppm to 3 vol. % based on the overall volume of the synthetic gas feed, in which the synthetic gas feedstock is contacted with a composition comprising an active material comprising one or more elements having an electronegativity from 1.6 to 2.0 on the Pauling scale, wherein at least a portion of the active material is a sulfide phase, and wherein arsenic at least partly replaces the sulfur of the sulfide phase.

15. The process of claim 14, wherein the active material is dispersed on a carrier material selected from the group consisting of aluminum oxide, silicon oxide, magnesium oxide, manganese oxide, zirconium oxide, titanium oxide, clay, zeolite, activated carbon, and cement.

16. The process of claim 15, wherein the active material and the carrier material are co-precipitated.

17. The process of claim 14, wherein the composition is formed into a product selected from the group consisting of extrusions, spheres, pellets, cylinders, and symmetrical and asymmetrical tri-quadrulobes.

18. The process of claim 14, wherein the contaminants comprise selenium, silicon, potassium, calcium, vanadium, iron, and nickel.

19. The process of claim 14, wherein the sulfide phase of the active material is formed by sulfiding the active material with one or more sulfur compounds under reducing conditions.

20. A composition for removing contaminants comprising one or more of arsenic and selenium from a synthetic gas feedstock comprising a sulfur compound in an amount that ranges from 50 ppm to 3 vol. % based on the overall volume of the synthetic gas feed, the composition comprising an active material consisting of a sulfide phase of the formula M-S, wherein M is one or more elements having an electronegativity from 1.6 to 2.0 on the Pauling scale, wherein arsenic will at least partly replace the sulfur of the sulfide phase.

21. The composition of claim 20 wherein the active material comprises one or more elements having an electronegativity from 1.8 to 1.95 on the Pauling scale.

22. The composition of claim 20 wherein the active material comprises one or more elements having an electronegativity from 1.85 to 1.91 on the Pauling scale.

23. The composition of claim 20 wherein the active material is dispersed on a carrier material selected from the group consisting of aluminum oxide, silicon oxide, aluminum-silicon oxide, magnesium oxide, manganese oxide, zirconium oxide, titanium oxide, clay, zeolite, activated carbon, and cement.

24. The composition of claim 20 wherein the active material is present in an amount that ranges from about 5 wt. % to about 100 wt. %, calculated as an oxide, and wherein the carrier material comprises the remaining wt. %.

25. The composition of claim 20, wherein the sulfide phase of the active material is formed by sulfiding the active material with one or more sulfur compounds under reducing conditions.

* * * * *